Feb. 25, 1941.  F. C. W. WILKINSON  2,233,232
INTERNAL GRIPPING DEVICE FOR SMOOTH BORE FERRULES
Filed April 26, 1939  2 Sheets-Sheet 1
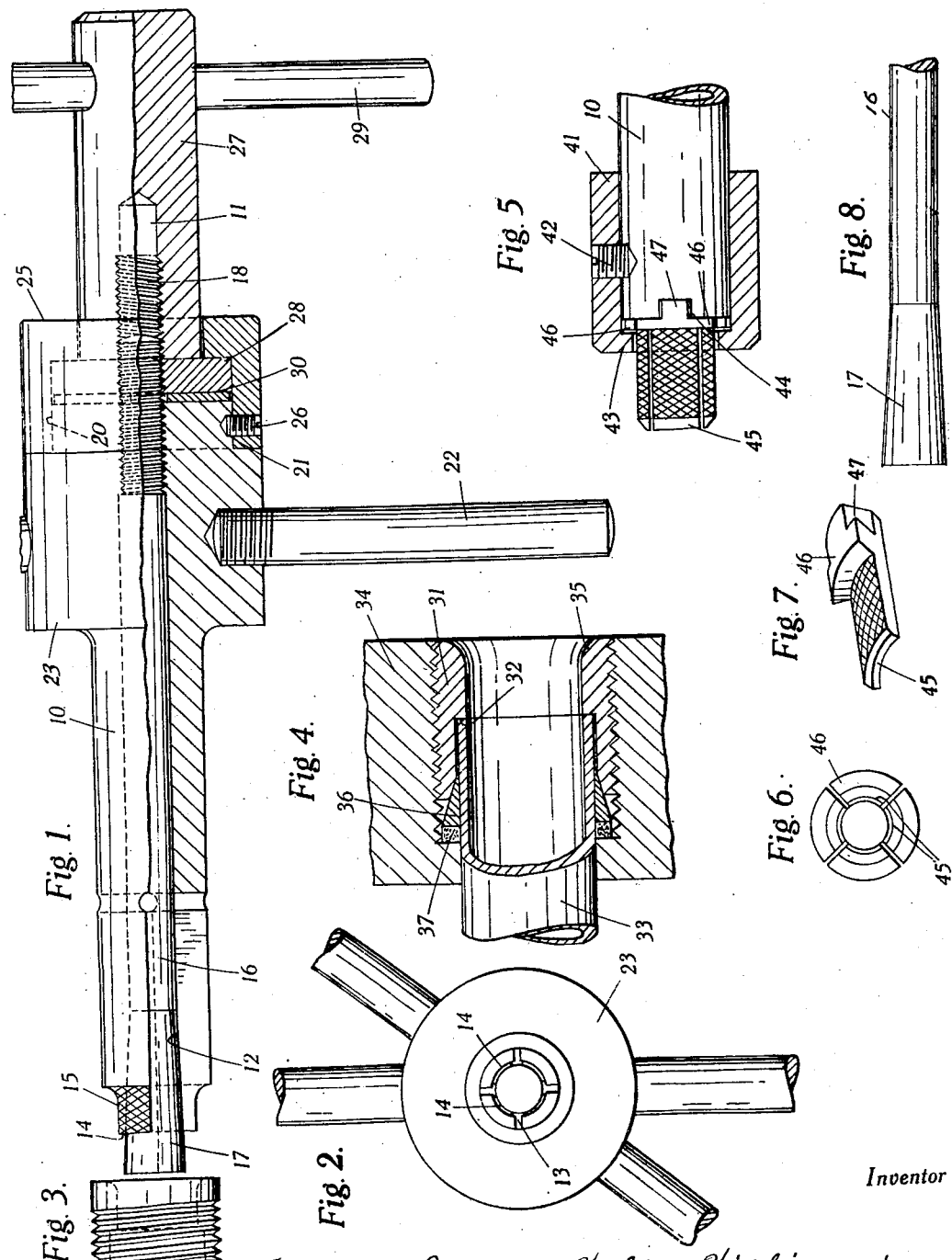
Inventor
Francis Clarence Walter Wilkinson,
BY: Chritton, Wiles, Davies, Hirschl and Dawson, Attorneys Feb. 25, 1941. F. C. W. WILKINSON 2,233,232
INTERNAL GRIPPING DEVICE FOR SMOOTH BORE FERRULES
Filed April 26, 1939 2 Sheets-Sheet 2
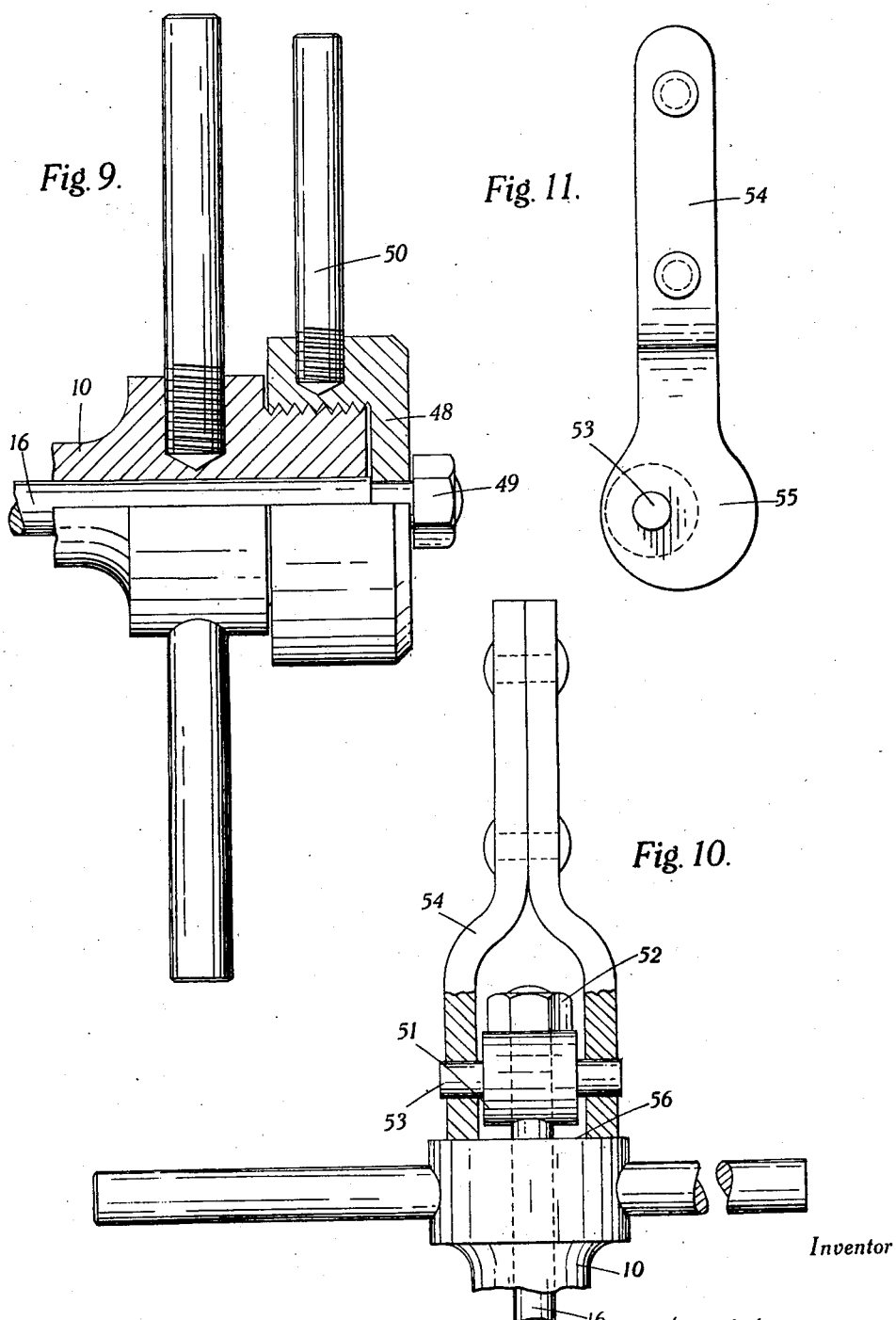
Inventor
Francis Clarence Walter Wilkinson,
By: Chritton, Wiles, Davies, Hirschl & Dawson Attorneys Patented Feb. 25, 1941

2,233,232

UNITED STATES PATENT OFFICE 2,233,232

INTERNAL GRIPPING DEVICE FOR SMOOTH BORE FERRULES

Francis Clarence Walter Wilkinson, Farnham Common, England, assignor to Crane Packing Company, Chicago, Ill., a corporation of Illinois Application April 26, 1939, Serial No. 270,222
In Great Britain June 3, 1938

3 Claims. (Cl. 81—72)

This invention relates to an internal gripping device for smooth bore ferrules.

The invention aims at constructing heat-transfer apparatus in which an externally screw-threaded ferrule is screwed in against packing in a recess in a tube sheet which surrounds the end of a condenser tube or of the tube of some other heat-transfer apparatus, the ferrules having a smooth, unbroken inner surface running flush and in continuity with the tube and plate surfaces in order not to obstruct liquid flow.

The ferrules used in the tube sheets of steam surface condensers and the like, are usually provided with a slot so that a tool like a screw driver may be employed to screw in said ferrule firmly against the packing and compress the same, so as to insure against leakage.

The main object of this invention is to provide an improved tool which will grip the inner surface of the ferrule or ring with sufficient friction to prevent slipping, so that the usual slot in the end of said ferrule may be dispensed with.

In some heat transfer apparatus the practice at present is to use ferrules, the slotted heads of which project beyond the tube plate. This offers a certain obstruction to the flow of the water and some of the erosion is attributed to the turbulence set up. To obtain the ideal, smooth flow, the ferrules should be screwed into the tube plate flush with the water side of said plate and the mouth of the ferrules or the inlet side should preferably be rounded to present a smooth surface. The tool of the present invention contributes to the desired end in that it is possible to use with it ferrules having a smooth, rounded opening and capable of being screwed in flush with the tube sheet.

Another object of the invention, therefore, is to provide a tool having a seat consisting of expansible jaws to engage the smooth inner surface of a ferrule, when expanded, and to release the same when contracted, said jaws being shaped to fit said smooth surface and exert the necessary pressure thereon without distorting said ferrules.

An additional object is to provide a tool by means of which a ferrule may be conveniently and quickly installed, adjusted during use, or removed.

In the accompanying drawings I have shown several embodiments of the invention. The preferred form comprises a cylindrical body or barrel, one end of which is of reduced diameter and is formed with integral jaws by virtue of a number of axially extending slits or slots which render said jaws sufficiently flexible to be expanded to engage the interior of a ferrule. A draw rod passes through said tubular member and has an externally threaded end which engages in an internally threaded bore in a large nut or cap member situated on that end of the tubular member which is remote from the jaws. Said draw rod has a conical end which engages the correspondingly tapered inner portions of said jaws as it is drawn into said tubular member, and forces said jaws apart. Said jaws are allowed to contract under their own resiliency when said draw rod is moved in the other direction.

In the accompanying drawings:

Figure 1 is a longitudinal half section and half elevation of the preferred form of the invention:

Figure 2 is a partial end view thereof:

Figure 3 is a side elevation of a ferrule:

Figure 4 is an enlarged sectional elevation of a tube end assembly:

Figure 5 is a side elevation partly in section of a modified form of the invention:

Figure 6 is an end view of the jaws:

Figure 7 is an enlarged perspective view of a jaw:

Figure 8 is a fragmentary elevation of a draw rod: and

Figures 9, 10 and 11 represent further modifications of the invention.

The tool, as shown in Figure 1, comprises a cylindrical housing or barrel 10 having a longitudinal opening or bore 11 with a flaring portion 12 near its outer end. Said end is provided with a plurality of cuts or slots 13 which, as shown in Figure 2, preferably intersect each other along the longitudinal axis of the housing and thus provide a plurality of resilient fingers or jaws 14, which in this case are integral with the housing. The end of said housing is of reduced diameter, as shown, and thus the integral tips or jaws are of metal which is not very thick, to ensure that said jaws will be sufficiently resilient for the purpose. Also the outer surfaces of said jaws are preferably roughened or knurled, as shown at 15.

These jaws may be forced apart by a movable, actuating member which has the form of a rod 16, movable longitudinally in the central opening 11. The outer end of said rod is flared or cone-shaped, as shown at 17, and the other end is screw threaded at 18. When the tapered end of the rod is drawn farther into the housing, it engages the correspondingly tapered inner surfaces of the jaws 14, causing them to expand radially and frictionally grip the ring or ferrule which has been slipped over the reduced end, as later described.

The end of the housing remote from the end having the expansible jaws, is provided with a projecting boss 20 which has a radial screw threaded recess 21 in it. A handle is also provided comprising a radially projecting bar or bars 22 which are mounted in a cylindrical enlargement 23.

The tool comprises in the main two parts, i. e. the barrel previously described and the cylindrical head or coupling member 25 which fits over the boss 20 and is secured thereto by a suitable set screw 26. This coupling fits loosely around an extension or shaft 27 having a head or disc 28 at one end and a handle 29 at the other end. Said shaft 27 has a screw threaded opening therein to receive the threaded end 18 of the rod 16, which it conceals. When the parts are assembled and the shaft 27 is rotated by hand with respect to the barrel 10, which is held against rotation by the handles thereon, the rod 16 is drawn into the shaft 27 and thus moves longitudinally in a direction to expand the jaws. To reduce the friction between the two relatively rotatable parts and to minimize wear, a suitable washer 30 may be interposed between the boss 20 and the cylindrical head 28. Said washer may be of bronze or other suitable material.

In the ferrule shown in Figure 4 the usual end slot has been omitted. Such ferrules frequently have a shoulder 32 therein (as shown) against which the end of the condenser tube 33 may abut, to limit its longitudinal movement due to expansion and contraction.

The ferrule is shown as screw threaded into the usual screw threaded opening in the tube sheet 34 and is provided with a flaring and rounded wall 35 to aid in a smooth flow of water into the tube at the entrance end. A fitting or cone-shaped ring 36 is also shown which is compressed against the tube and grips the same when the ferrule is screwed in firmly, to provide a substantially air-tight and water-tight joint between the tube sheet and the end of the condenser tube. A packing ring 37 may be employed also, in the position shown.

In installing a ferrule of this type, or any externally screw threaded ring, it is slipped over the jaws of the tool and the other end of said tool is rotated with respect to the main body portion, thereby expanding the jaws and causing them to grip the inner surface of the ring, where it has the smallest internal diameter. This frictional grip is sufficiently secure so that the tool may then be rotated by hand, by means of the handles 22, or otherwise, to screw the ferrule in as firmly as may be required. In the case of an assembly of the kind shown in Figure 4, for example, in which the ferrule has a flaring opening at the inner end which fits over and compresses a cone-shaped ring, it is necessary to force said ferrule over said ring with considerable pressure so that said rings or cones, which are soft-annealed, may be compressed tightly around the tube, making a tight joint. This requires a strong ferrule wrench or tool as the pressure required is much more than would be necessary in compressing a ferrule against a piece of soft packing. To release the tool from the ferrule, the handle 29 is rotated with respect to the handle 22 in a direction to move the cone-shaped expanding element 17 outwardly, whereupon the jaws spring inwardly sufficiently to release the tool from the ferrule.

In Figures 5, 6, 7 and 8 I have shown a modified form of the invention in which the barrel 10 has a cap 41 fitted over the end and held in place by a set screw 42, said cap having a flange 43 which is spaced from the end of the barrel to provide a clearance. The end of said barrel 10 also has a series of slots 44 therein, there being four such slots in this instance. A plurality of renewable jaws 45 are provided, all of which are alike and which in this instance are separate from the barrel instead of being an integral part of it. Each of said jaws is shaped as shown in the perspective view Figure 7 and is provided with a flange 46 which is received within the recess referred to, and which is provided also with a projection 47 received within the slot 44 so that when the barrel is rotated, said jaws will rotate with it. Said jaws are expanded in the same manner as the integral jaws previously described, i. e., by means of the cone-shaped enlargement 17 on the rod 16, shown in Fig. 8.

It will be noted that when the parts are assembled in interfitting relation, the jaws cannot fall out as they are, in effect, hooked over the annular flange 43 and they cannot collapse toward each other as such movement is obstructed by the cone-shaped enlargement 17.

One advantage of the detachable jaws is that any one of them may be renewed if necessary. Also, they may be made of special steel and in different sizes so that one barrel or driving head may be used with several different sets of jaws suitable for different sizes of ferrules. Another advantage is that when the tool is expanded to grip a ferrule the detachable jaws move outwards remaining parallel to their original orientation, thus providing a better grip than the integral jaws which are splayed and thus tend only to engage and grip the ferrule by their outer edges.

The type of tool having integral jaws may also be made in various sizes and is in fact preferable for small sizes as it is more difficult to make and assemble very small individual jaws, as distinguished from thin resilent jaws integral with the tool.

With both forms of the invention the ferrule may be screwed into place with the necessary pressure and the tool or driver may be released quickly and withdrawn.

It will be appreciated that the tool may also be used with a ferrule or annular member having a square or otherwise polygonally shaped internal section over a part of its length, even though the advantages of the gripping action in such case do not show as favourable a contrast as compared with a specially shaped key or wrench. The advantages of my construction are more apparent in the case of a smooth, internal surface which ordinarily it is difficult to grip without slipping.

Figures 9, 10 and 11 represent modifications of the means for moving the draw-rod 16, designed to speed up the operation of engaging and disengaging the ferrules during fitting. In the modification shown in Figure 9 a cap 48 is secured to the reduced diameter of the draw-rod, at the end remote from the conical portion 17, by a nut 49. The cap 48 is internally threaded with a double-start thread to engage a co-acting thread on the end of the barrel 10. Handlerods 50, screwed into the cap 48 facilitate its turning, and thus allow the draw-rod to be moved axially fore-and-aft as desired. In the modification shown in Figures 10 and 11 there is secured to the end of the draw-rod 16, remote from its conical enlargement, a block 51 by means of nut, 52. Pins 53 extending laterally from the block 51 engage in eccentric apertures of the ends of a fork 54 which may, as shown, be formed of two parts riveted or otherwise secured together to form a handle. The enlarged ends 55 of this fork ride against the flat end 56 of the barrel 10, so that as the fork 54 is turned about the axis formed by the pins 53 a cam action is provided to move the draw-rod 16 through the barrel. Reverse movement of the fork 54 releases the draw-rod 16.

What I claim is:

1. A tool of the class described comprising a housing having a cap removably secured to one end with an inwardly turned flange spaced from said end to form a clearance, a plurality of separate jaws each having a hook at one end to engage said flange loosely in said clearance space and thus permit radial movement of said hooked ends, a member having an outwardly flaring end positioned between said jaws to hold them loosely in place, said member being movable longitudinally into said housing to contact said jaws and spread the same apart throughout their length.

2. A tool of class described comprising a tubular housing having radial notches in the end thereof, a cap secured to said end and having an inwardly directed flange spaced from said end to provide a clearance, a plurality of jaws each having an axial extension to be received in one of said notches and having a segmental flange to be received loosely in said clearance space, movable means between said jaws for spreading their outer ends apart, a head at the other end of said tubular housing detachably secured thereto, and manually operable means extending through said head for actuating said jaw spreading means.

3. A tool of the class described comprising a tubular housing having notches in the end thereof, a cap secured to said end and having an inwardly directed flange spaced from said end to provide a clearance, a plurality of jaws each having an extension to be received in one of said notches and having a partial annular flange to be received in said clearance space and have a small radial movement therein, and means between said jaws for engaging both ends thereof and spreading said jaws apart, said means having a rod connected thereto at one end, extending through said tubular housing and screw threaded at a distance from said end, and a rotatable extension at the other end of said tubular housing, engaging the same and fitting the screw threaded portion of said rod to move the same longitudinally and to conceal the same.

FRANCIS CLARENCE
WALTER WILKINSON.